United States Patent [19]

Speckin

[11] 3,920,295
[45] Nov. 18, 1975

[54] COLUMN MOUNTED TOOL HOLDER
[76] Inventor: Leonard A. Speckin, 308 Academy, Portland, Mich. 48875
[22] Filed: Dec. 20, 1973
[21] Appl. No.: 426,545

[52] U.S. Cl. ............... 312/108; 108/114; 108/151; 211/107; 248/221; 312/330
[51] Int. Cl.² ..................................... A47B 87/00
[58] Field of Search .......... 108/151, 154, 114, 149, 108/110, 50, 111, 107, 64; 403/344; 248/125, 221, 226 D, 68 CB, 67.5; 211/107; 52/753

[56] References Cited
UNITED STATES PATENTS

| | | | |
|---|---|---|---|
| 1,350,367 | 8/1920 | Giddings | 211/107 |
| 2,327,743 | 8/1943 | Rosenberg | 52/753 |
| 2,356,318 | 8/1944 | Hayman | 248/68 CB |
| 2,932,870 | 4/1960 | Williams | 248/67.5 |
| 3,000,512 | 9/1961 | Maynor | 108/151 |
| 3,397,431 | 8/1968 | Walker | 403/344 |
| 3,495,795 | 2/1970 | Brown | 248/221 |
| 3,588,152 | 6/1971 | Shomo | 403/344 |

Primary Examiner—Roy D. Frazier
Assistant Examiner—Darrell Marquette
Attorney, Agent, or Firm—D. Edward Dolgorukov

[57] ABSTRACT

This invention relates to an improved column mounted tool holder whereby the typical basement or factory support column is utilized for mounting of two complimentary shaped structural members that, when bolted together, form a work area completely surrounding said column. The present invention includes two (2) members of preferably the same size and shape, and having V-grooves in similar positions on each of said members and adapted to engage the commonly found supporting column of circular cross-section found in the basement workshop or factory. When bolted together by the various means disclosed, the two (2) members form a table which engages the column or stanchion pipes by means of the notches pressing against said pipe on all four sides and firmly gripping it due to the friction existing between the members and the pipe. Therefore, there is provided a table firmly held on the pipe on which can be mounted small hand or power driven tools. By virtue of the shape and positioning of the notches, as well as additional spacers which can be mounted therein, the present invention can fit a large variety of sizes of columns or stanchion pipes. Therefore, there is provided an improved Column Mounted Tool Holder for mounting small power tools, hand tools and the like, which makes use of the otherwise wasted space typically taken up by home or factory supporting columns.

6 Claims, 13 Drawing Figures

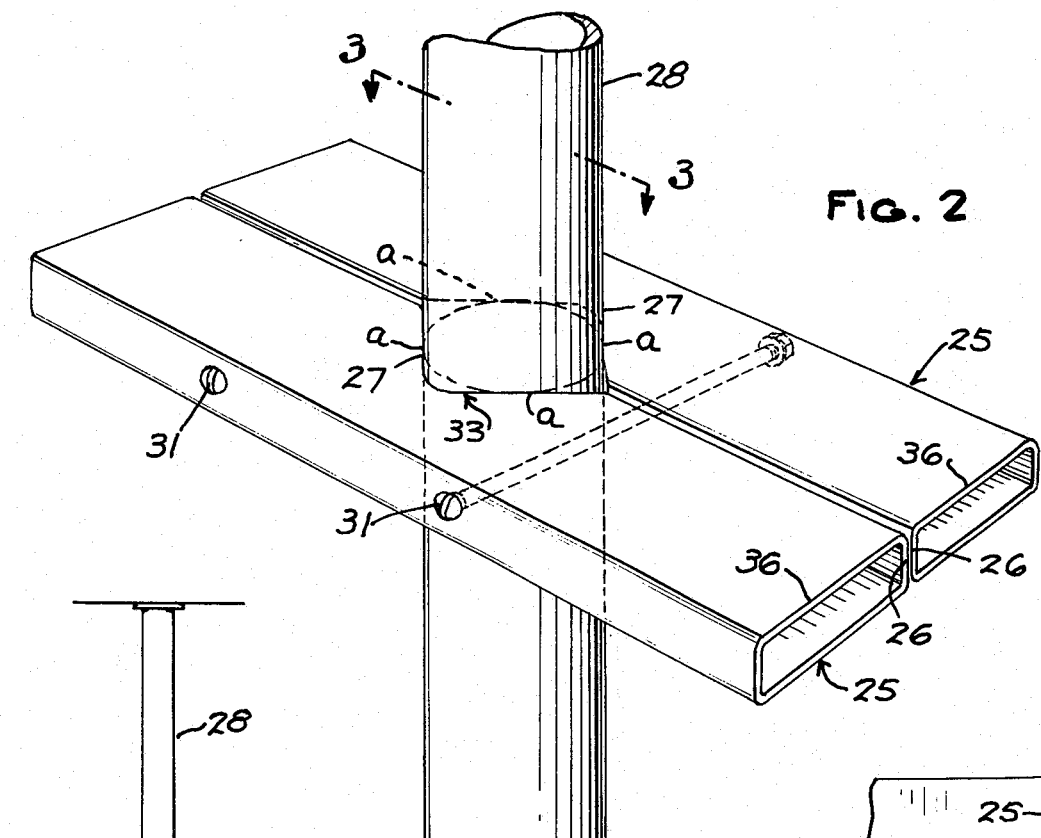

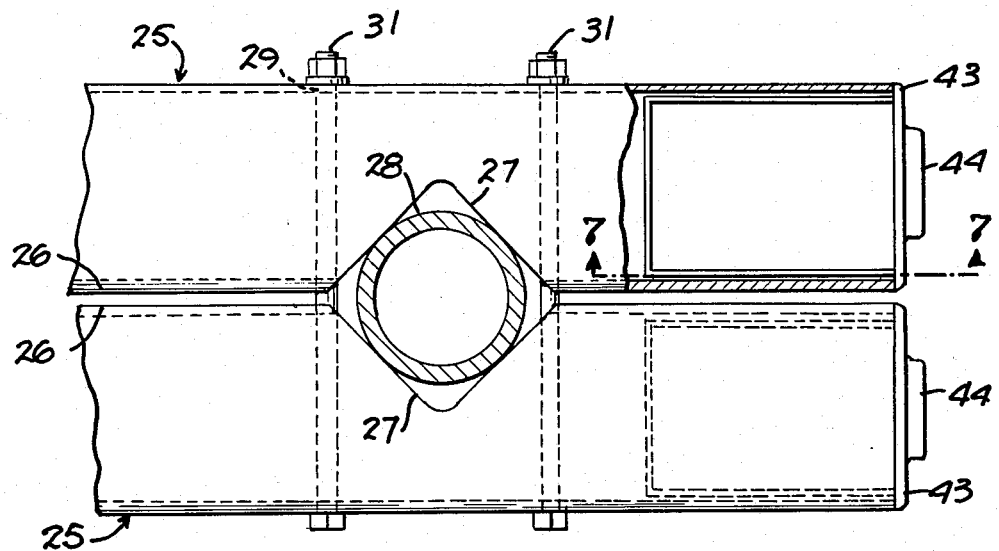
FIG. 6
FIG. 7
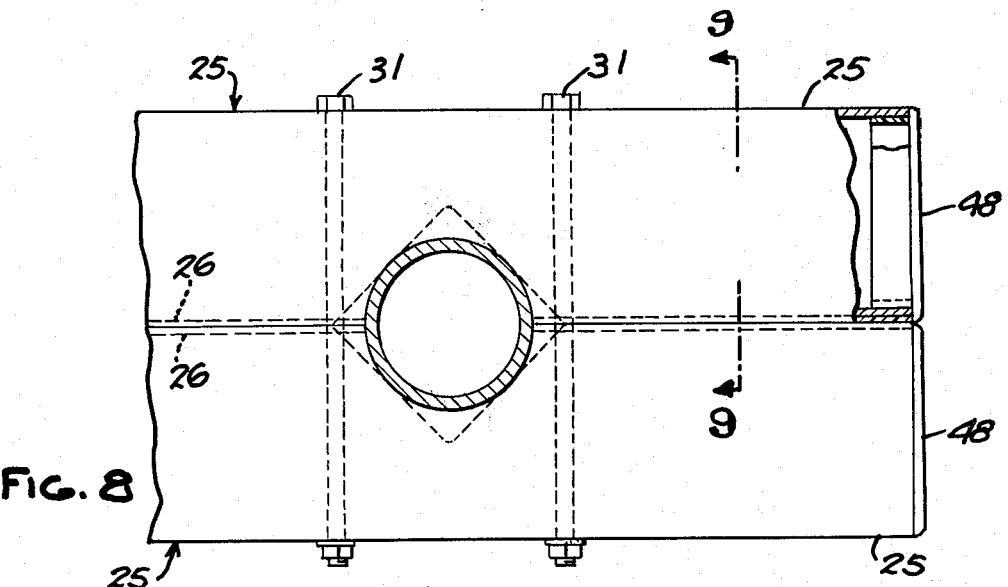
FIG. 8
FIG. 9

COLUMN MOUNTED TOOL HOLDER

This invention relates to a column mounted tool holder for mounting of power or hand operated tools or similar devices in areas where floor space is at a premium, such as in the typical home workshop or factory environment. The mounting of these tools in useful working positions is accomplished without the use of any additional floor space by making use of the typical basement stanchion pipe or support column.

Applicant having had for several years a home workshop of his own, and being all too familiar with the space problems present in such home workshops, has long sought ways to more efficiently utilize the limited amount of space available. It is conventional practice in such home workshops to mount small power tools or hand operated tools upon a freestanding work bench which takes up considerable amounts of floor space. In addition, the tools take up valuable work area on the top of said work bench, which is also at a premium.

In applicant's search for a better way to mount small power tools and the like, Applicant at first attempted to obtain conventional pedestal stands, such as are used in factories for the mounting of grinders and the like, at a reasonable price which the home workshop enthusiast could afford. Applicant was thwarted in his attempt due to the relatively expensive nature and scarcity of supplies of such pedestal stands, putting the expense of mounting the typical tools found in the home workshop beyond the means of most people similarly situated. In addition, it is common that such a pedestal will only hold one type of power tool, making the purchase of a number of pedestal stands necessary at relatively expensive prices.

Finding the relatively great expense and limited use of conventional pedestal stands not satisfactory, Applicant kept looking for different methods of clearing the typical home workbench of power tools so that it could be used for its intended purpose. Having several vertical support pipes in his home workshop, Applicant next sought a way to provide a table supported by the support column, whereby several hand or power operated tools could be mounted thereon with the necessary rigidity, whereby the work could be approached from all sides, and the expense of conventional mounting means could be greatly reduced.

Applicant is familiar with one device which has attempted to solve the above mentioned problems. Such device is disclosed in the patent to R. H. Brown entitled "Vice Holder", bearing U.S. Pat. No. 3,495,795. However, even this device leaves several problems unsolved in the search to find a satisfactory column mounted tool holder. First of all, this device can only be used to mount a vice due to its specific construction, and doesn't allow mounting of any other tools. In addition, it is a relatively expensive device possibly costing more than the previously mentioned pedestal stands and, therefore, out of the reach of many home workshop enthusiasts.

In addition, since the Brown device appears to be only an adaptation of the idea on which a drill press table is based, it can only be used on one size pipe, which could have only a very limited variation in size. This condition is just not found in home or factory stanchion pipes which can vary, plus or minus 0.050 inch in diameter, and come in different sizes. For instance, if the Brown device was made to fit a 4 inch diameter pipe, if the pipe had a diameter of 3.95 inch, it is quite possible that when tightening the device up to get a firm grip on the column, due to the fact that it is probably made of cast iron, the device itself may crack, rendering it completely useless.

Also, I have found that many homes have a 3 inch or 3-½ inch diameter support column, rather than the typical 4 inch diameter column. While the device of Brown, if made for one diameter column, cannot be changed to another diameter column if the owner of such device should move, by providing simple spacers, I have made my invention useable on all of the above diameter columns. In addition, because of the design of the notches, the diameter of the pipe can vary plus or minus seventy-thousands or more, and still firmly grab the support column.

Accordingly, it is an object of the present invention to provide a column mounted tool holder to utilize the heretofore wasted floor space occupied by the typical stanchion pipe in the home workshop or elsewhere.

Another object of the present invention is to provide a column mounted tool holder for use in the home workshop to eliminate the problem of the scarcity of supply of conventional pedestal stands for power tools at reasonable prices.

A further object of the present invention is to provide a column mounted tool holder providing sufficient space to mount several different size items.

A further object of the present invention is to provide a column mounted tool holder of sufficient rigidity to firmly hold relatively heavy hand and power operated tools such as may be found in the typical home workshop.

A still further object of the present invention is to provide a column mounted tool holder which is adaptable to fit the large variation in diameters found in the typical basement stanchion pipe.

A still further object of the present invention is to provide a column mounted tool holder having storage drawers provided therein for holding small parts and the like.

A still further object of the invention is to provide a column mounted tool holder which is relatively simple and inexpensive to manufacture.

A still further object of the present invention is to provide a column mounted tool holder which is easily manufactured in a wide variety of sizes and shapes.

Further objects and advantages of this invention will be apparent from the following description and appended claims, reference being had to the accompanying drawings forming a part of this specification, wherein like reference characters designate corresponding parts in the several views.

FIG. 1 is a side elevational view showing the tool holder of the present invention mounted on a support column, and having a vice and bench grinder mounted thereon.

FIG. 2 is a perspective view of the present invention mounted on a support column.

FIG. 3 is a sectional view taken in the direction of the arrows on the section line 3—3 of FIG. 2.

FIG. 4 is a plan view of the present invention, partially cut away, showing a different method of fastening the two halves of the tool holder together.

FIG. 5 is a sectional view taken in the direction of the arrows on the section line 5—5 of FIG. 4.

FIG. 6 is a plan view of the present invention, partially cut away, showing parts drawers installed in the ends of the structural members forming parts of the present invention.

FIG. 7 is a partially cut-away sectional view taken in the direction of the arrows on the section line 7—7 of FIG. 6.

FIG. 8 is a plan view of the present invention, partially cut away, showing means for closing the otherwise open ends of the present invention, and showing the installation of a cover on the top surface of the invention for the purpose of providing a completely flat and noise dampening work surface.

FIG. 9 is a sectional view taken in the direction of the arrows on the section line 9—9 of FIG. 8.

Figure 10:
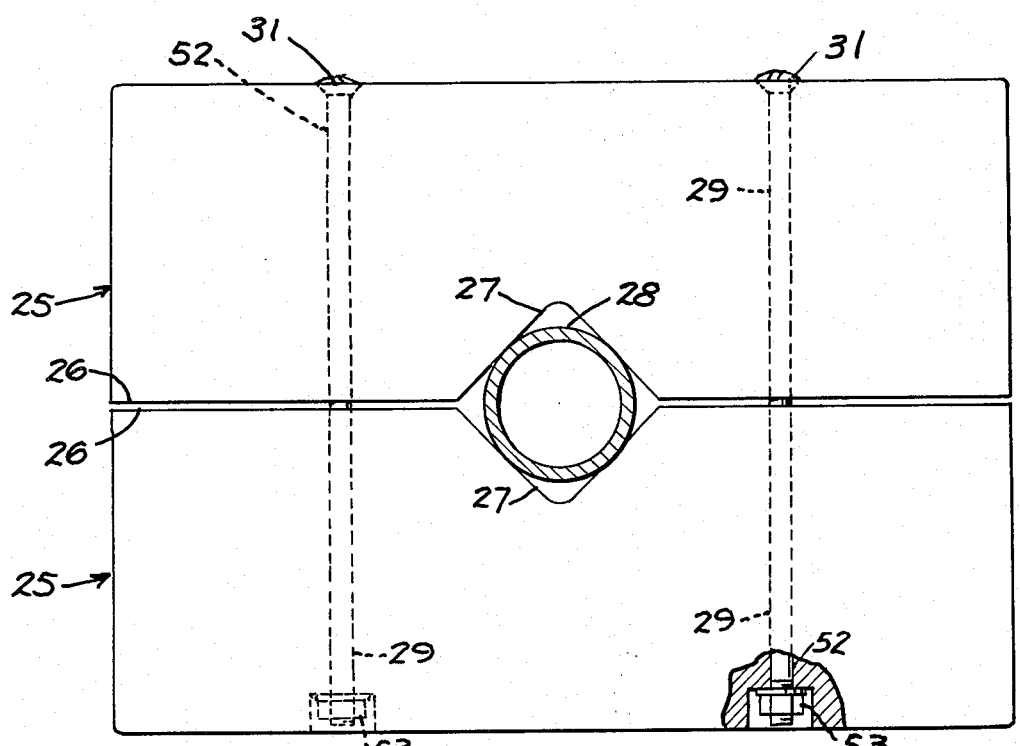
FIG. 10 is a plan view showing a modification of the present invention wherein the two structural members forming a part of the invention are of solid metal construction to provide the necessary rigidity for extra heavy power tools and machines, etc.

It is to be understood that the invention is not limited in its application to the details of construction and arrangement of parts illustrated in the accompanying drawings, since the invention is capable of other embodiments and of being practiced or carried out in various ways within the scope of the claims. Also it is to be understood that the phraseology and terminology employed herein is for the purpose of description, and not of limitation.

In accordance with my invention, referring to FIGS. 1-3, I provide at least two structural members, in this case made of rectangular seamless tube, and generally designated by the number 25, each of which has at least one side complementary in shape to one side of the other structural member so that they will fit together when assembled to form a substantially unitary construction, when fastened with appropriate means. The matching or complementary side on each of the two frame members is designated by the numeral 26. In each of the complementary shaped sides 26 is provided a V-groove 27 of substantially the same size and shape, said V-groove also being in substantially the same position in each of said edges. The dimension of the V-grooves 27 are selected so that when the two structural frame members 25 are bolted together in contiguous positions by means of the bolt and nut assemblies 31, the diamond shape opening formed by the V-grooves 27, and generally designated by the numeral 33, will have its longest dimension slightly smaller than the outside diameter of the support column 28, so that the support column will be engaged at points around its periphery as shown in FIG. 3 with the letter a.

It should be understood that while the two structural members 25 are shown here made of seamless rectangular tubing and are rectangular in shape; the members 25 could be of any suitable shape so long as the sides of the frame members such as 26 were complementary in shape and the V-grooves 27 were placed in positions in each of said members 26 such that the support column 28 would be engaged at the points as previously described. For instance, square or semi-circular frame members may be used. Also, more than two structural members may be used if the need should arise, as long as the shapes of each of the members where such that, when assembled in contiguous positions, a substantially flat and continous work area were formed by the top surfaces of said structural members. I feel that this feature of my design allows my column mounted tool holder to be made in practically any size and shape depending on the particular job that must be done in the work-shop, and the number of tools to be mounted thereon. For instance, by making the frame members 25 of greater width, tools may be mounted around the entire periphery of the support column 28, while if this is not practical, making the frame members of greater length than shown in FIG. 2 could result in the mounting of several tools side by side on each side of the column 28, depending on the space available. All this being accomplished without the use of valuable floor space in the workshop and without significantly increasing the production cost of the tool holder. It should also be understood that by virtue of using V-grooves 27 to engage the post 28, a great variety of sizes and shapes of columns can be utilized by my invention. This is in complete contrast to the previous design of column supported tables, which were designed for, and had to be used on only one size support column, or which could not be assembled around the support pipe, but had to be mounted over the top of the pipe, which made them unusable for the purposes of the present invention.

For instance, referring to FIG. 3, merely lengthening the bolts 31 will permit my device to fit on a larger column than the one shown therein. While I normally make the size of the V-grooves so that the standard 4 inch diameter column will cause the two members 25 of my tool holder to be slightly separated, so that upon tightening the bolts 31, the column 28 will be firmly engaged within a range of approximately .070 inch of column diameter, I have also provided for the situation where a smaller column may be encountered.

Figure 13:
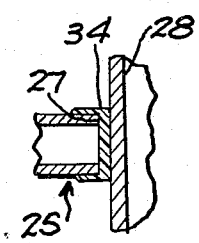
FIG. 13 is a partial sectional view taken in the direction of the arrows on the section line 13—13 of FIG. 12.

Referring to FIG. 13, by means of the spacers 34 which fit over the edges of the V-grooves 27, I can provide for my invention to fit 3 inch, 3 ½ inch, or other diameter columns, within practical limits. Again, if the spacers 34 are provided, they are designed so that the dimension of the opening 33 formed in the frame members is smaller than the column by approximately 0.070 inch, so that if variation is found in the size of the support column, this will be compensated for.

It should be understood that by virtue of the V-groove construction, I have solved the previous problem present in the art of what to do when the diameter of the column is found to vary from its normal dimensions. If the column is larger than anticipated, the two sides 26 of the members 25 are forced to be spaced a slightly greater than normal distance apart, while if the column is slightly smallar than its nominal dimension, the provision of making the V-grooves of a size such that the opening is smaller than the column, provides that a smaller than anticipated support column will still be gripped firmly, with the edges 26 of the structural members 25 merely coming closer together.

Another advantage of my design is immediately apparent in the situation where a substantially square-shaped support column is found, such as when an I-beam is used as a support column. In this instance, instead of providing a curved portion 35 on the inner edges of the V-groove 27, I provide that this portion be a right angle. It can then be seen that when the two halves 25 of the tool holder are bolted together, an I-beam will be gripped firmly by the V-grooves 27, again firmly supporting the tool holder.

In an application where the two structural members 25 must be of greater length to form a longer work surface on the top surfaces of the structural members 25, or in applications where it is not possible to put the bolt and nut assemblies 31 entirely through the structural members 25 due to the width thereof, or for other reasons, fastening means such as those shown in FIGS. 4 and 5 may be used.

In this embodiment, holes 39 are provided in identical positions near the end of the members 25 in the side 26 thereof. A C-shaped member 37 with holes 38 provided so as to align themselves with the holes 39 is provided, through which a shorter bolt and nut assembly 42 is passed and tightened down. In this way fastening means to provide rigidity for the column mounted tool holder are provided.

Referring specifically to FIGS. 6 and 7, I have provided small drawers 43 of suitable size to fit in to the opening at each end of the member 25. Such drawers may be of any length desired and are only limited by the position of the bolt and nut assemblies 31. The width of the drawers is preferably substantially the same as the width of the opening in the end of the member 25, while the height of the drawer is substantially the height of said opening. In this way I have provided storage space for the small parts normally used in connection with the devices which are intended to be mounted on my improved column mounted tool holder. Such storage space not previously being available, and causing much added work and aggravation to the person attempting to use a tool mounted on a support column, as he must constantly make trips back and forth to the work bench to obtain needed parts. Handles 44 may be provided on the drawers 43 for ease in opening and closing said drawers.

While I generally prefer not to provide any special holes or other means for mounting the tools thereon, but prefer to let the user of my column-mounted tool holder drill holes in the top surface 36 of the structural members 25 in accordance with his particular needs, and the devices he desires to mount, in certain cases, as in FIG. 7, it may be desirable to provide tool mounting studs 45 as an integral part of my device. These studs may be welded on as shown, or threads may be provided so that these studs may be screwed into the top surface of the frame member. In certain instances it may be desirable that one of the studs, such as number 46, protrude slightly into the area occupied by the drawer 43, so as to provide a positive stop for said drawer when the back portion 47, of the drawer 43, contacts the bottom of the stud 46, thereby preventing the drawer from being pulled completely out.

Referring to FIGS. 8 and 9, when it is not desired to have drawers in the ends of the members 25, for safety purposes, the ends of the structural members 25 may be closed by any suitable means, such as providing plastic end caps 48.

I have also found it desirable in some instances to close the gap existing by virtue of the two sides 26 of the members 25 being spaced apart some small distance as previously described. I have found that in some instances, small tools or objects common in the home workshop may fall through such opening and be easily lost or stepped upon. For this reason I have provided the closures 49, shown best in FIG. 9. These closures are substantially L-shaped, and may be made of any suitable material. I prefer that these be molded for soft plastic for ease of manufacture. It can be seen that the longer portions 50 of the closures 49, when properly mounted, form a continuous flat work surface, while the shorter portions 51 fill in the gap left by the opening between the sides 26 of the members 25.

The closures 49 may be very useful for different purposes, depending upon the material they are made of. The closures may be very useful in damping the vibration present in many motor driven power tools, therefore, eliminating the problem of the vibrations set up in the members 25, by virtue of the operation of the electric tools or other devices, from causing small parts or other objects to vibrate and fall off the work surface 36. A maximum damping of the vibration can be expected when the closures 49 are molded from a softer type material, such as a soft plastic or rubber. It should be understood that the closure can also be made of one piece construction, rather than the two piece construction shown in FIG. 9.

Figure 11:
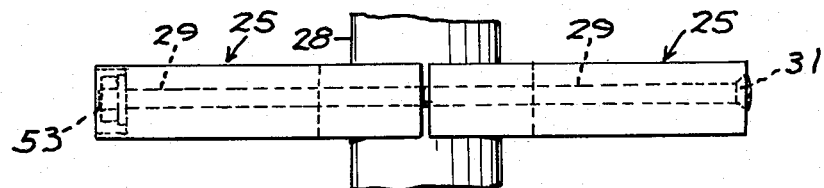
FIG. 11 is a side elevational view of the modification shown in FIG. 10.

Referring to FIGS. 10 and 11, there is shown an example of how the structural members of my invention can be made of a solid construction, rather than the hollow tubular construction previously shown. In this illustration, the members 25 are shown of a solid metal construction, such as cast or plate aluminum or other metal. The details of construction of this embodiment of the invention are substantially similar to that just disclosed for the tubular construction, with the exception that in this instance, the bolt and nut assemblies 31, instead of passing through holes 29 drilled in relatively thin metal, must pass through holes 52 drilled through solid metal. In order that the bolt and nut assembly 31 will not dangerously protrude from the edge of the solid metal piece, counter-sunk recesses 53 are provided to enclose the end of the bolt and nut assembly. Such recesses either may be cast in, if the material used is suitable for casting purposes, or milled in, if plate material is used.

I wish it understood that, although in all of the illustrations of my invention I have shown the structural members 25 as being made out of some sort of metal, for applications where it would be practical, my invention is fully capable of being carried out with the use of wood, plastic, or other suitable structural members.

Figure 12:
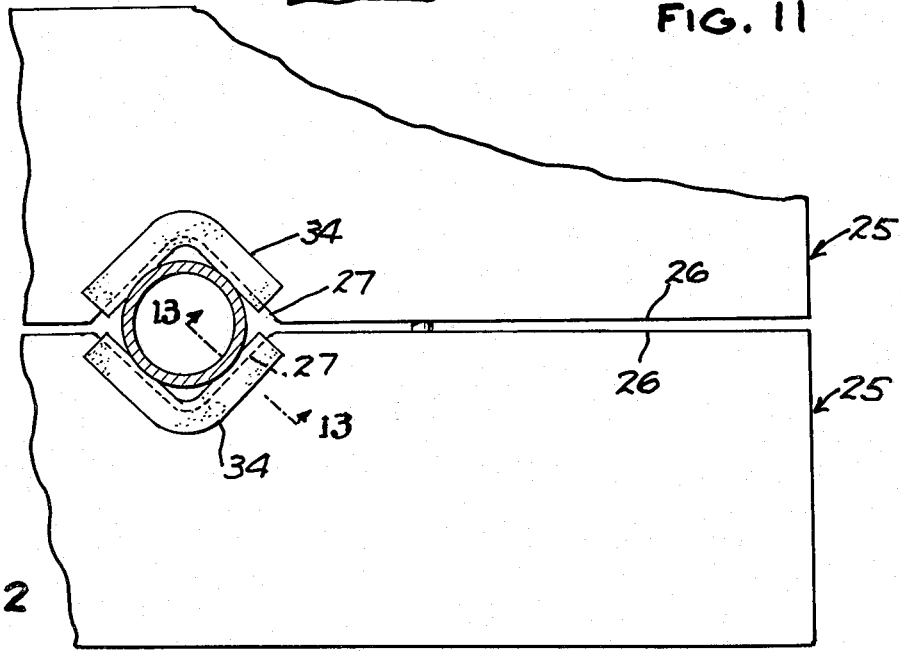
FIG. 12 is a cut away plan view of the present invention with spacers installed in the V-grooves thereof to adapt said invention for installation on smaller than normal size support posts.

Now referring to FIGS. 12 and 13, as previously mentioned, spacers 34 may be inserted into the V-grooves 27 to provide for the situation where a smaller than normal size basement support column is encountered. Such spacers may either be used on the hollow tubular structural members, as shown in FIG. 13, or on solid members as shown in FIGS. 10 and 11.

There is thus provided an improved column mounted tool holder whereby the objects of the present invention listed above, and numerous additional advantages are attained.

I claim:

1. A column mounted tool holder including in combination two structural members of hollow construction, each having top and side walls, each of said members having one of said side walls complementary in shape to one side wall of the other of said structural members, said structural members being adapted, when placed in contiguity with said complementary shaped walls in substantial alignment, to form a substantially flat and continuous work surface from the top surfaces of said structural members, a load bearing V-groove provided in said complementary shaped walls of each of said structural members and being adapted to engage a support column when such structural members are assembled, and integral fastening means to hold such structural members in contiguity and adapted to place pressure on said support column by means of said V-grooves, thereby supporting said tool holder on said support column without any other supporting means, and with no modification to said support column, wherein said structural members are constructed of rigid tubing having a rectangular cross section, and are provided with a generally rectangular drawer in at least one end of one said structural members to provide storage space for small parts.

2. The device defined in claim 1, and including suitable means to close the ends of such structural members which do not have drawers therein, for safety purposes.

3. The device defined in claim 2, and including means to fill the gaps remaining in said work surface after such structural members are assembled, said means being adapted to provide a continuous working area on the top surfaces of said members to prevent small parts from falling between said structural members.

4. The device defined in claim 3, and including spacers adapted to fit over said V-grooves, thereby decreasing the size of said diamond shaped opening to adapt said tool holder to fit different size support columns, wherein said spacers are of metallic construction and have substantially a C-shaped cross section.

5. The device defined in claim 4, wherein said structural members are of a metallic material and being of over-all rectangular shape, open at both ends thereof.

6. The device defined in claim 3, wherein said gap closure means are in the form of a pair of soft plastic inserts of substantially L-shaped cross section, each of said inserts having a longer and a shorter leg, with said shorter legs being adapted, when placed together, to fill the gap between said support members.

* * * * *